United States Patent [19]

Larrabee

[11] 4,136,818
[45] Jan. 30, 1979

[54] LIGHT-SHIELDING TUBE HOLDER FOR USE WITH BLOOD WASHING APPARATUS

[75] Inventor: Edward W. Larrabee, Bronxville, N.Y.

[73] Assignee: Union Carbide Corporation, New York, N.Y.

[21] Appl. No.: 845,299

[22] Filed: Oct. 25, 1977

[51] Int. Cl.² ............................................. B04B 15/12
[52] U.S. Cl. ................................. 233/1 R; 233/19 R; 233/14 R; 128/214 E
[58] Field of Search .................. 233/1 R, 14 R, 14 A, 233/19 R; 128/214 E

[56] References Cited
U.S. PATENT DOCUMENTS

| 3,985,133 | 10/1976 | Jenkins et al. | 128/214 E |
| 4,069,968 | 1/1978 | Herman | 233/14 R |

Primary Examiner—George H. Krizmanich
Attorney, Agent, or Firm—Warrick E. Lee, Jr.

[57] ABSTRACT

A device for holding a transparent tube in an optical sensor while excluding light from external sources. The device is automatically positioned for excluding external light upon insertion of the tube into the optical sensor.

6 Claims, 8 Drawing Figures

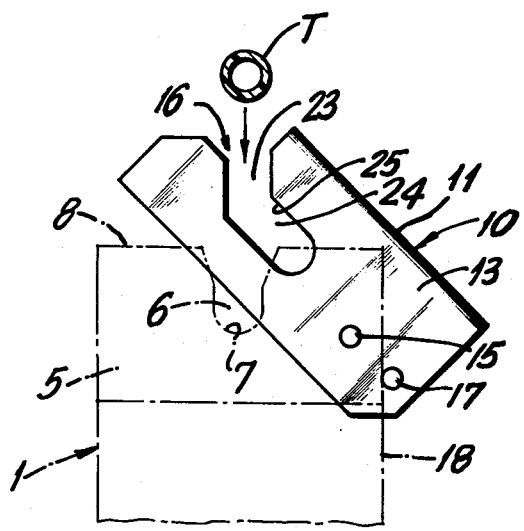
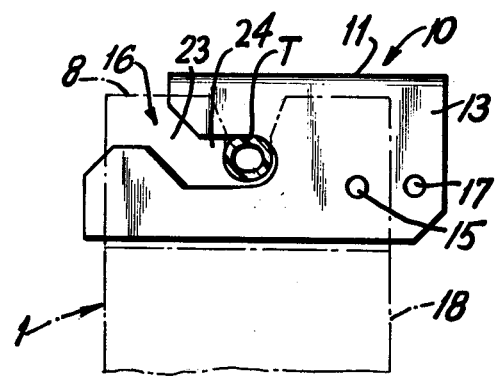
FIG.4  FIG.5
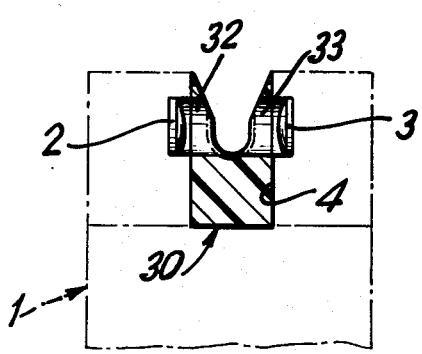
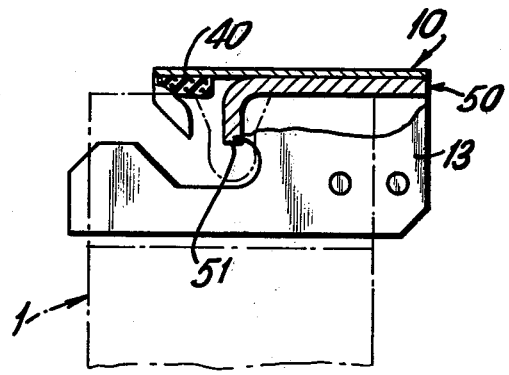
FIG.7  FIG.8

LIGHT-SHIELDING TUBE HOLDER FOR USE WITH BLOOD WASHING APPARATUS

BACKGROUND

This invention relates to blood washing apparatus, and more particularly to blood washing apparatus in which the flow of opaque fluids through transparent tubing is detected with optical sensors. Specifically, the invention is a device that holds a transparent tube in an optical sensor, and shields the optical sensor from external light.

Blood washing is a procedure known to the art, for example, as described in U.S. Pat. No. 3,982,691 — Centrifuge Separation and Washing Device and Method — Charles A. Schultz issued Sept. 28, 1976. As described in the above-noted patent, human blood from volunteer donors is washed to remove unwanted constituents such as contaminants, toxicants, viruses, medicants, glycerines, cellular debris and the like, using a device based on centrifugal separation. Such a device includes a rotatable enclosure into which liquids, such as blood and wash liquids, e.g., saline solutions are injected, and from which the washed blood, wash liquids and unwanted constituents are removed. While the device described in the above-noted patent can be used to wash blood continuously, in a particular mode of operation, a predetermined amount of blood, e.g., a package available from a blood banking organization, is washed using predetermined packaged quantities of wash solution. Under such batchwise operation, wherein the apparatus is frequently started and stopped, it is imperative that the various steps in the start-up and shut-down procedure for the blood-washing apparatus be carried out with precise timing.

Apparatus for washing small batches of blood is disclosed by Herman in U.S. Pat. application Ser. No. 737,607, filed Nov. 1, 1976, now U.S. Pat. No. 4,069,968, the entire disclosure of which is incorporated herein by reference. In an embodiment of the Herman apparatus, optical sensors detect the start and finish of blood flow through transparent tubes. The sensors provide electrical signals to a control unit, which, in turn, provides signals to the various valves and pumps in the blood-washing apparatus, causing certain steps in the wash cycle to be performed at the proper times.

Optical sensors typically comprise a light emitting diode, or other source of light, and a photo transistor, or other photo-sensitive member, mounted on opposite sides of an opening. Light from the diode is sensed by the transistor. A transparent tube, through which the flow of an opaque liquid is to be detected, is placed in the opening, in the optical path between the diode and transistor. When the opaque liquid (e.g. blood) flows through the tube, the transmission of light from the diode through the optical path to the transistor is interrupted, and the transistor sends an appropriate signal to the control unit. Obviously, light from sources external to the optical sensor must be excluded, if flow of opaque fluid in the tube is to be detected.

In the blood-washing apparatus of Herman, the transparent tubing has no free ends that would fit into a hole the size of the tubing. Hence, the opening in the optical sensor must be a slot, into which a loop or bight of tubing may be inserted. The prior art method of excluding external light from the sensor was to fasten a light shield, for example, opaque tape, over the opening after the tubing has been inserted. The difficulty with this method is that the operator may forget to install the shield, causing the blood apparatus to fail to perform the right step at the right time.

OBJECTS

Accordingly, it is an object of this invention to provide a device for shielding an optical sensor from external light that is automatically positioned, upon insertion of a transparent tube into the optical path of an optical sensor.

It is another object of this invention to provide a device for holding a transparent tube in the optical path of an optical sensor.

SUMMARY OF THE INVENTION

These objects are achieved by the present invention which comprises:

A device for holding a transparent tube in the optical path in a first slot in a top surface of an optical sensor for detecting the amount of light passing through said tube and for shielding light from external sources from said optical sensor comprising:

(a) an opaque cover containing a second slot for receiving said tube,
(b) said cover movably attached to said optical sensor for limited movement between an open position and a closed position, such that said cover blocks said first slot when in the open position, and such that said cover excludes light from external sources from said optical sensor when in the closed position,
(c) said second slot located such that:
 (1) while said second slot pushes said tube below the top surface of said optical sensor, as said cover is moved from the open to the closed position, a portion of said second slot always coincides with a portion of said first slot, forming an opening large enough for said tube, and
 (2) when said cover is in the closed position, a portion of said second slot coincides with the optical path of said first slot forming an opening large enough for said tube, thereby holding said tube in place and shielding said optical sensor from light from external sources.

The term "opaque" as used throughout the present specification and claims is intended to mean being impervious to sufficient light to activate the light-sensitive member. Hence, although a substance may pass some light, if it does not pass sufficient light to activate the light-sensitive member of the optical sensor, it is "opaque".

IN THE DRAWINGS

FIG. 4 is a side view of the light shielding tube holder of FIG. 3 in the open position.

FIG. 5 is a side view of the light shielding tube holder of FIG. 3 in the closed position.

FIG. 7 is a side view of the apparatus of FIG. 6 showing the insert in position.

FIG. 8 is a side view of the apparatus of FIG. 6 showing the gasket and compression member.

DETAILED DESCRIPTION OF THE INVENTION

Figure 1:
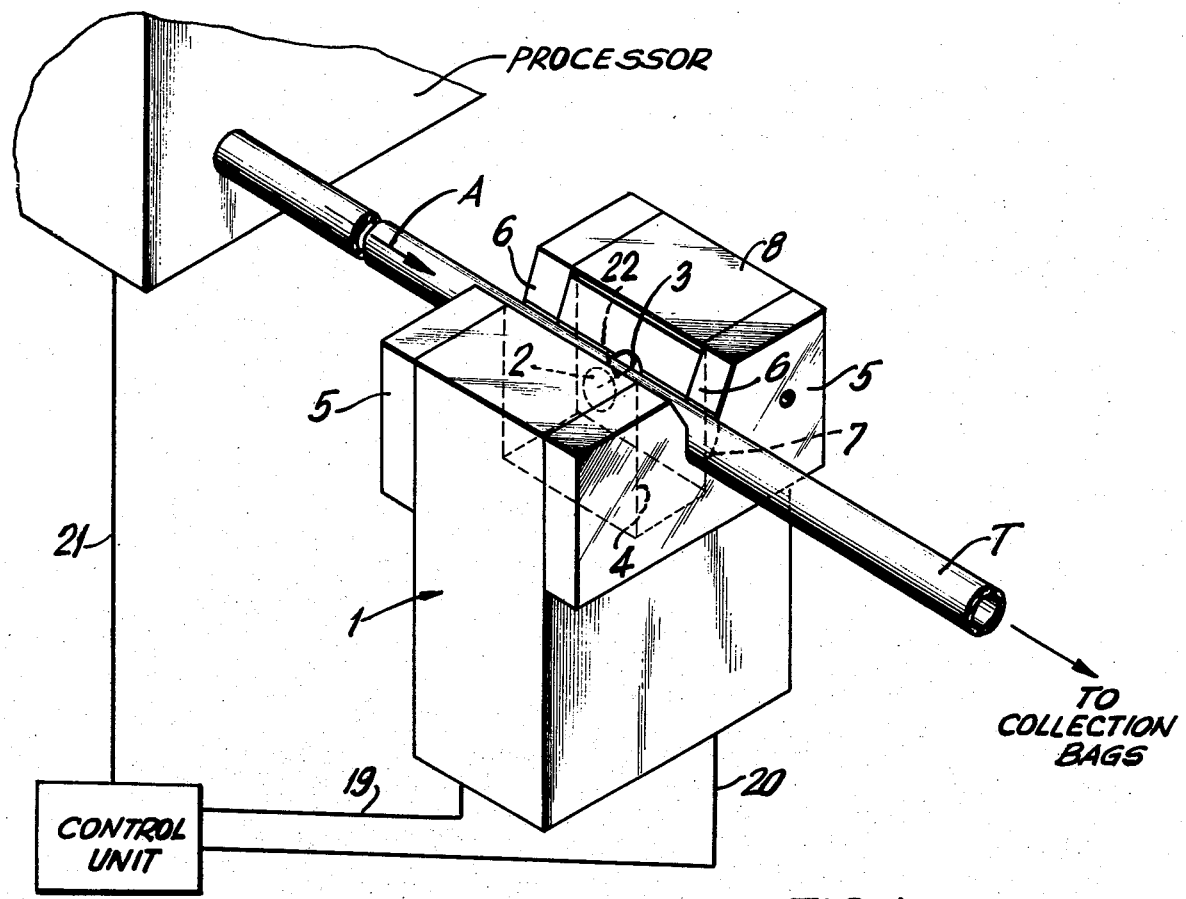
FIG. 1 is an isometric view of an optical sensor, without a light shield mounted in conjunction with blood washing apparatus.
Figure 2:
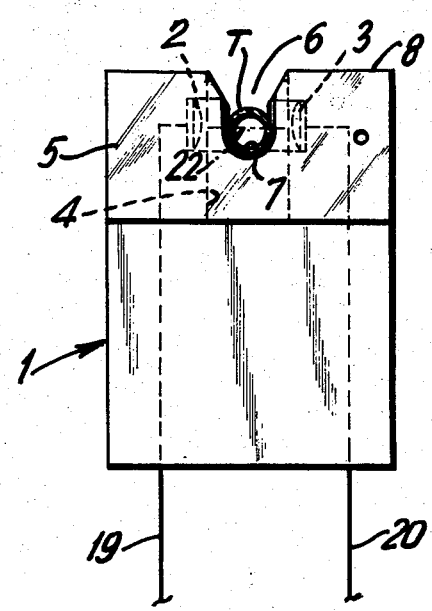
FIG. 2 is a side view of the light sensor shown in FIG. 1.

FIGS. 1 and 2 illustrate a typical optical sensor on which the device of the present invention is mounted. The optical sensor 1 has a light-emitting diode 2 and a photo-transistor 3 mounted on opposite sides of a rectangular slot 4. If the transparent tube, through which the flow of opaque fluid is to be detected, is larger than slot 4, then adaptors 5 are mounted on either side of slot 4. For clarity, adaptors 5 are shown dotted in FIG. 2. Each adaptor has a slot 6, having a circular end 7. Adaptors 5 are fixedly positioned such that when tube T is seated in the circular ends 7 of slots 6, the tube lies in the optical path 22 between diode 2 and transistor 3.

The apparatus functions as follows. A transparent tube T is inserted into slot 6, and seated in circular end 7. Light from diode 2 travels through optical path 22 through transparent tube T to transistor 3, as long as optical path 22 remains open. The purpose of the optical sensor is to detect the presence of an opaque fluid as it flows through tube T, in the direction indicated by arrow A, from the processor to collection bags or other parts of the blood washing apparatus, as shown in FIG. 1. When the opaque fluid, such as blood, flows through the transparent tube, optical path 22 between diode 2 and transistor 3 is blocked, and transistor 3 will no longer sense light, provided light from external sources is excluded. When transistor 3 no longer senses light, it signals the control unit via wires 20. The control unit then sends a signal via wires 21 to the appropriate valves and pumps in the processor, and the blood-washing sequence is carried out. Wires 19 supply electrical power to diode 2. It should be kept in mind that the processor, control unit, and wiring are shown only schematically to illustrate an application of the present invention. In actuality, there are more than one wire. Also, each blood washing unit uses more than one light sensor, as described in U.S. application Ser. No. 737,607, filed Nov. 1, 1976, now U.S. Pat. No. 4,069,968, the entire contents of which has already been incorporated herein by reference.

The method of excluding external light practiced in the prior art was to place opaque tape (not shown) over top surface 8, of optical sensor 1. To ensure complete exclusion of light, the tape also had to cover the non-circular end of slot 6. If the operator did not affix the tape properly or if the step were completely forgotten, transistor 3 would not sense the flow of an opaque fluid through the tube, because it would sense external light after the fluid entered the tube.

Figure 3:
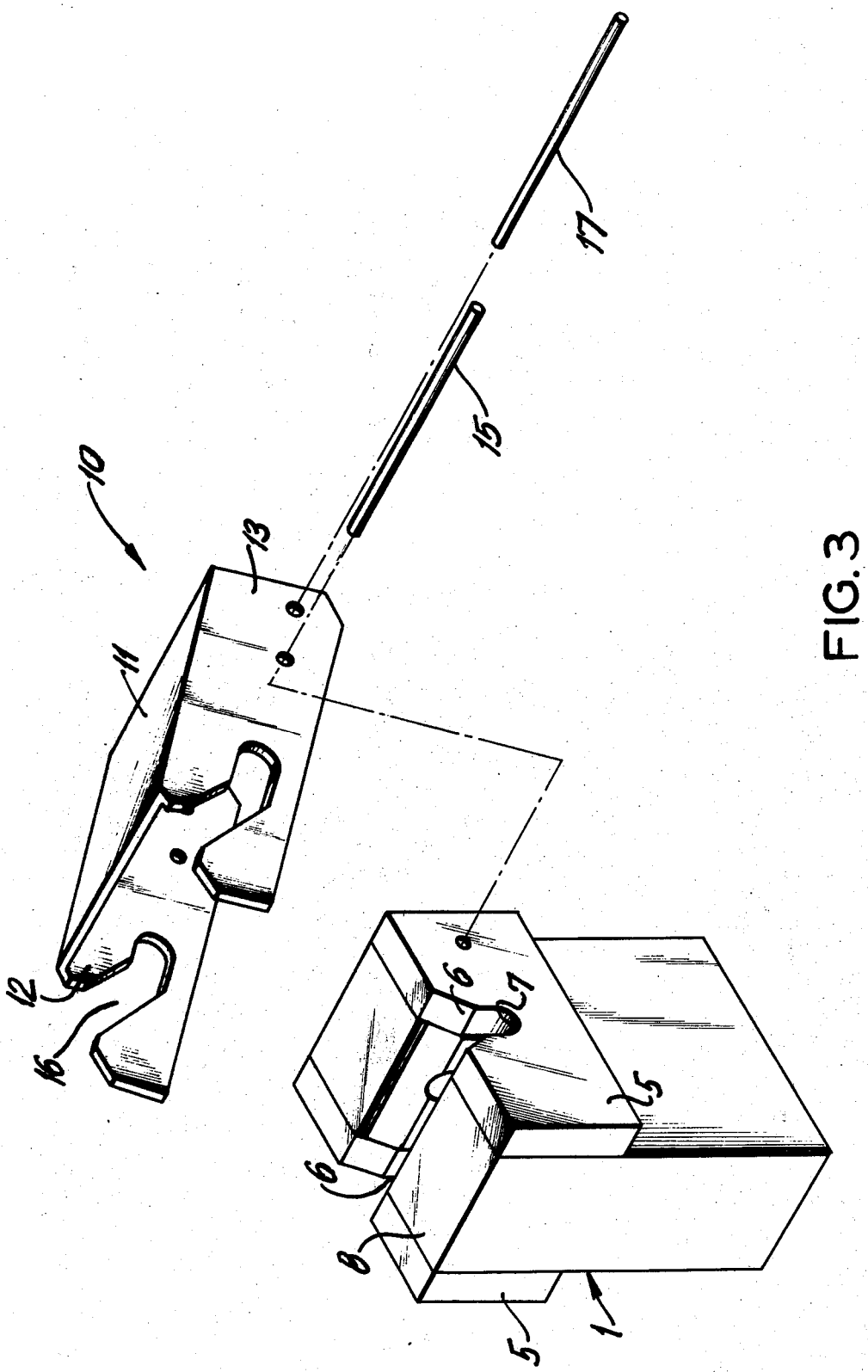
FIG. 3 is an exploded isometric view of a light shielding tube holder in accordance with the present invention.

FIGS. 3, 4 and 5 illustrate the device of the present invention, which automatically shields the optical sensor from external light when the tube is inserted into the optical path between the diode and the transistor. The optical sensor, to which the device of the present invention is attached, is the same as that illustrated in FIGS. 1 and 2. As illustrated in FIGS. 3, 4 and 5 the invention comprises a cover 10 that is roughly box shaped; that is, roughly in the form of a rectangular parallelepiped. Cover 10 is formed by pressing a flat piece of an opaque substance, such as metal, into a channel, having 3 sides, labeled 11, 12 and 13 in FIG. 3. Top side 11 appears as a line in the side views of FIGS. 4 and 5. Rear side 12 does not appear in FIGS. 4 and 5. Only front side 13 appears in full view in FIGS. 4 and 5.

Cover 10 is pivotally mounted on optical sensor 1 by hinge pin 15. Cover 10 has a crooked slot 16, having two legs 23 and 24.

The device functions as follows. Cover 10 is moved to its open position, as shown in FIG. 4. Cover 10 may not be opened any farther than shown because its movement is blocked by block pin 17 striking surface 18 of optical sensor 1. In the open position, cover 10 blocks slot 6 of the optical sensor. Hence, it is impossible for an operator to simply insert a tube into slot 6 and forget to close the light shield.

A transparent tube T is inserted into slot 16, in the direction indicated by the arrow, through leg 23 and as far as possible into leg 24. Cover 10 is then pivoted about hinge pin 15 to the closed position, shown in FIG. 5. Top surface 25, of leg 24 pushes tube T downward in the direction shown by the arrow. As the tube is pushed below top surface 8 of optical sensor 1, into slot 6, a portion of slots 16 and 6 always coincide to form an opening large enough for tube T. Hence, the tube does not interfere with closing the cover. Tube T does not reach circular end 7 of slot 6 until cover 10 is completely closed. When cover 10 is completely closed, top side 11 and side surfaces 12 and 13 shield the optical sensor from external light, allowing it to accurately detect the flow of opaque fluid in tube T in the optical path between the diode and transistor (not shown in FIGS. 3, 4 and 5).

Cover 10 is shown pivotally attached to optical sensor 1 in FIG. 4. Of course any method of movably attaching the cover to the optical sensor for limited movement between an open position and a closed position is acceptable, provided that the other criteria of the invention are met.

Figure 6:
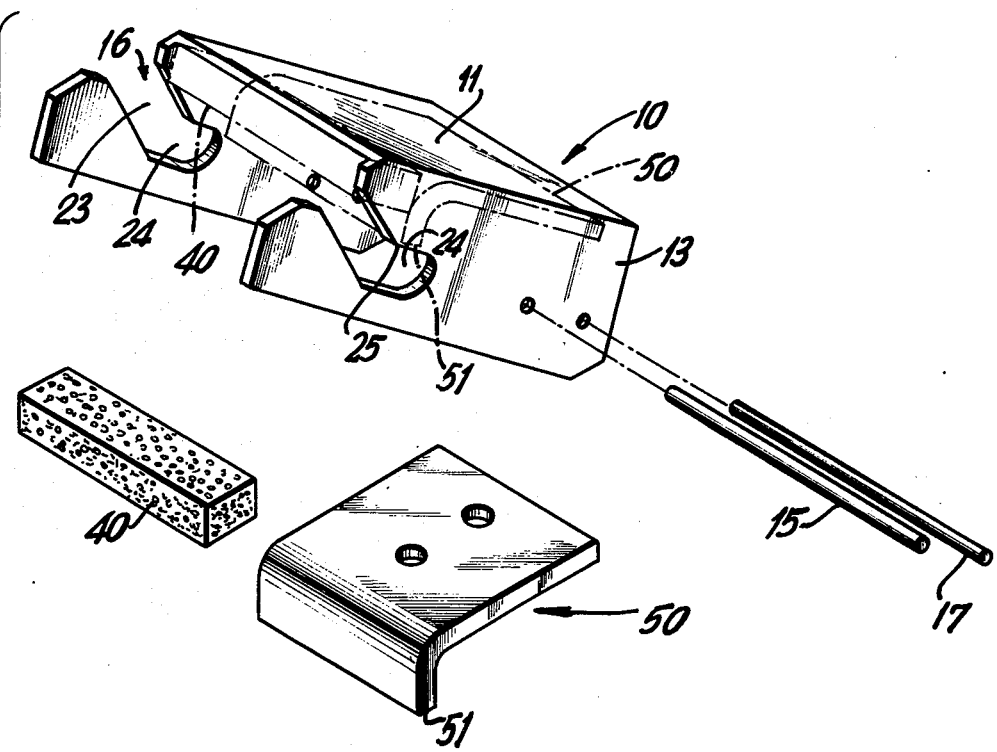
FIG 6 is an exploded isometric view of preferred additions to the device shown in FIGS. 3, 4 and 5.
Figure 6:
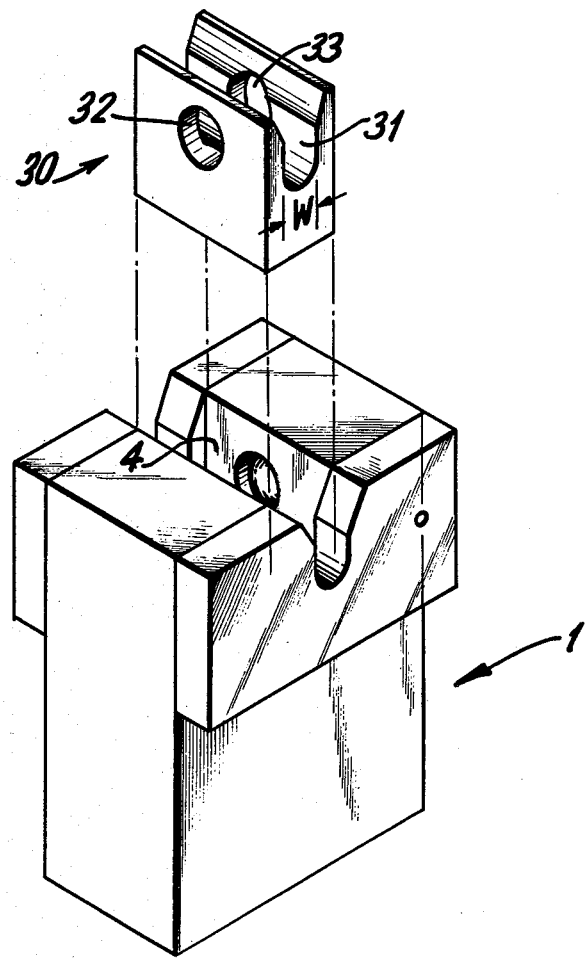

FIG. 6 is an exploded isometric view of preferred additions to the apparatus shown in FIGS. 3, 4 and 5. An opaque insert 30 fits into slot 4 of optical sensor 1. Insert 30 has a slot 31 that tapers to width W at the optical path. Holes 32 and 33 permit light to pass through the insert 30 through the optical path between the diode and transistor. The width W is slightly less than that of the transparent tube, which causes the tube to be squeezed into an eliptic cross-section as it enters the optical path. It has been found that for a tube having a diameter of about 0.160 inches (4.1 mm), width W should be about 0.125 inches (3.2 mm). A gasket 40, made of black foam rubber, is attached to the bottom of top side 11 of cover 10, on the end of side 11 that is closest to slot 4 of optical sensor 1. Gasket 40 helps assure that external light is excluded when cover 10 is closed. "L" shaped compression member 50 is riveted to the bottom of top side 11 of cover 10 such that compression bar 51 is even with top surface 25 of leg 24 of slot 16. Compression bar 51 helps push the tube into slot 31.

FIG. 7 is a side view of the apparatus of FIG. 6 (without the tube holder), showing insert 30, inserted into slot 4.

FIG. 8 is a side view of the apparatus of FIG. 6 showing gasket 40 and compression member 50 assembled into tube holder 10. The tube holder is shown attached to optical sensor 1.

While the present invention has been disclosed in connection with the preferred embodiment thereof, it should be understood that there may be other embodiments which fall within the spirit and scope of the invention as defined by the following claims.

What is claimed is:

1. A device for holding a transparent tube in the optical path of a first slot in a top surface of an optical sensor for detecting the amount of light passing through said tube and for shielding light from external sources from said optical sensor comprising:
   (a) an opaque cover containing a second slot for receiving said tube,
   (b) said cover pivotally attached to said optical sensor for limited movement between an open position and a closed position, such that said cover blocks said first slot when in the open position, and such that said cover excludes light from external sources from said optical sensor when in the closed position,
   (c) said second slot located such that:
      (1) said second slot pushes said tube below the top surface of said optical sensor, as said cover is moved from the open to the closed position,
      (2) while said cover is moved from the open to the closed position, a portion of said second slot always coincides with a portion of said first slot, forming an opening large enough for said tube, and
      (3) when said cover is in the closed position, a portion of said second slot coincides with the optical path of said first slot thereby holding said tube in place and shielding said optical sensor from light from external sources.

2. The device of claim 1 mounted on blood washing apparatus.

3. The device of claim 2 wherein said cover is pivotally attached to said optical sensor by hinge means.

4. The device of claim 3 wherein said second slot is crooked, having a first leg and second leg.

5. The device of claim 4 wherein said cover has 3 sides forming a channel which fits over said optical sensor.

6. A device for holding a transparent tube in the optical path of a first slot in a top surface of an optical sensor for detecting the amount of light passing through said tube and for shielding light from external sources from said optical sensor comprising:
   (a) an opaque cover containing a second slot for receiving said tube,
   (b) said cover movably attached to said optical sensor for limited movement between an open position and a closed position, such that said cover blocks said first slot when in the open position, and such that said cover excludes light from external sources from said optical sensor when in the closed position,
   (c) said second slot located such that
      (1) said second slot pushes said tube below the top surface of said optical sensor, as said cover is moved from the open to the closed position,
      (2) while said cover is moved from the open to the closed position, a portion of said second slot always coincides with a portion of said first slot, forming an opening large enough for said tube, and
      (3) when said cover is in the closed position, a portion of said second slot coincides with the optical path of said first slot, thereby holding said tube in place and shielding said optical sensor from light from external sources.

* * * * *